A. WOOD, 3D.
GAS PORT FOR REGENERATIVE FURNACES.
APPLICATION FILED JAN. 7, 1910.
1,084,688.
Patented Jan. 20, 1914.
2 SHEETS—SHEET 1.
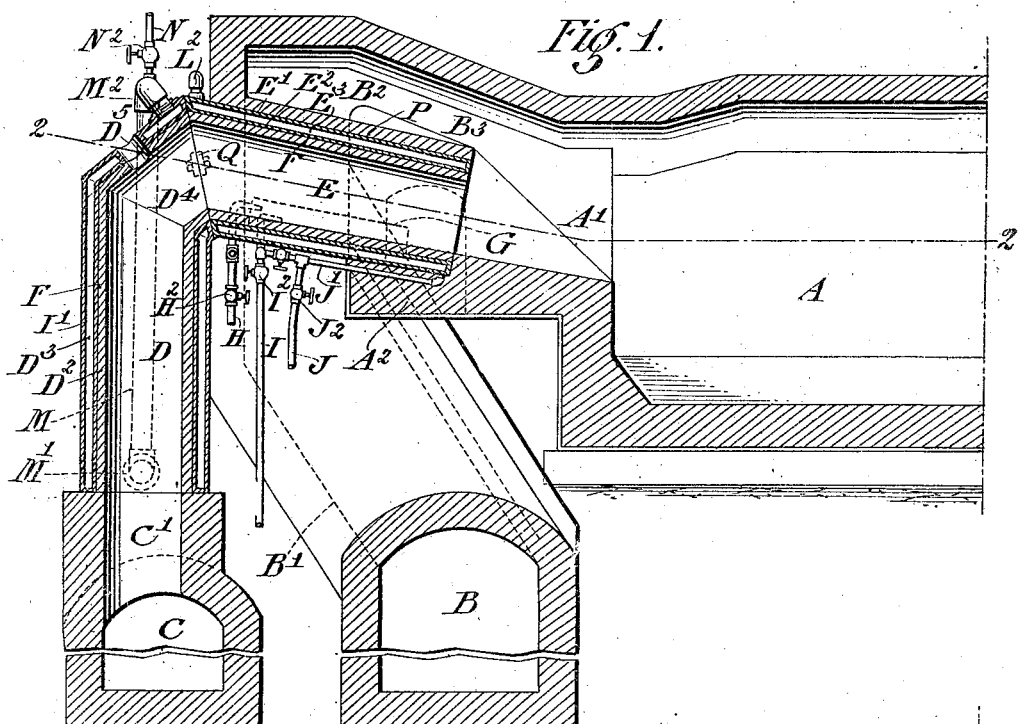
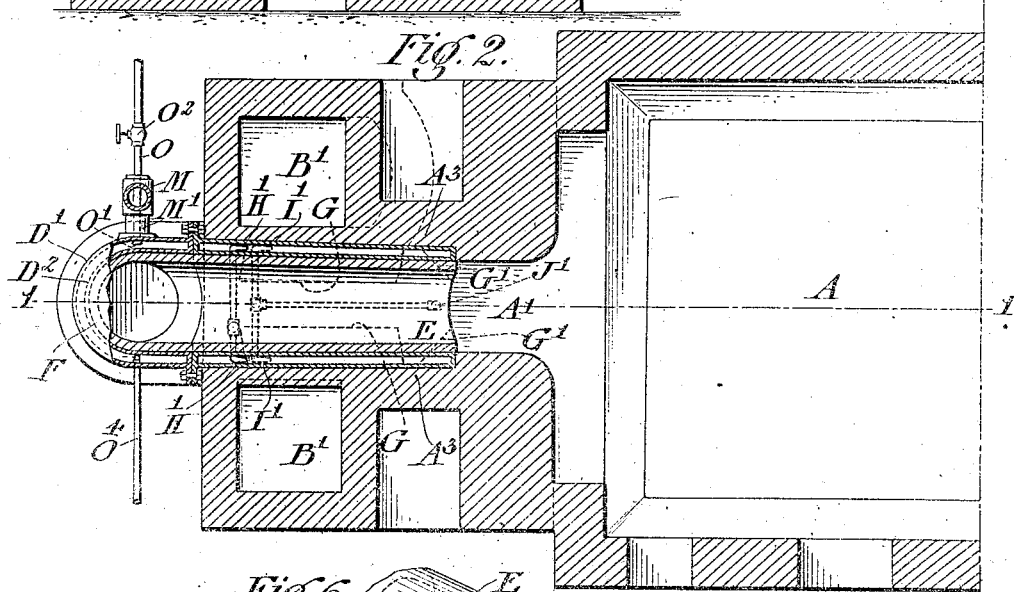
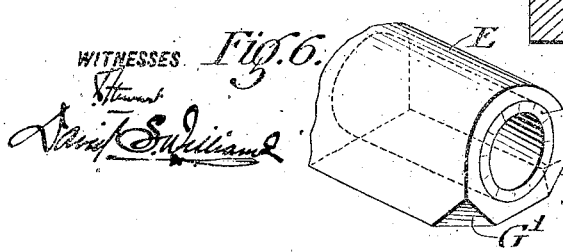

A. WOOD, 3D.
GAS PORT FOR REGENERATIVE FURNACES.
APPLICATION FILED JAN. 7, 1910.

1,084,688.

Patented Jan. 20, 1914.

2 SHEETS—SHEET 2.

WITNESSES

INVENTOR
Alan Wood 3d.
BY
his ATTORNEY.

UNITED STATES PATENT OFFICE.

ALAN WOOD, 3D, OF CONSHOHOCKEN, PENNSYLVANIA.

GAS-PORT FOR REGENERATIVE FURNACES.

1,084,688.   Specification of Letters Patent.   Patented Jan. 20, 1914.

Application filed January 7, 1910. Serial No. 536,780.

*To all whom it may concern:*

Be it known that I, ALAN WOOD, 3d, a citizen of the United States of America, residing in Conshohocken, in the county of Montgomery and State of Pennsylvania, have invented a certain new and useful Improvement in Gas-Ports for Regenerative Furnaces, of which the following is a true and exact description, reference being had to the accompanying drawings, which form a part thereof.

My invention relates to the construction of gas ports for regenerative furnaces and has for its object to provide a water cooled gas port construction which will be at once very durable under the exigencies of use and readily replaceable if for any reason repair or replacement becomes necessary.

The nature of my improvements will be best understood as described in connection with the drawings, and in which—

Figure 3:
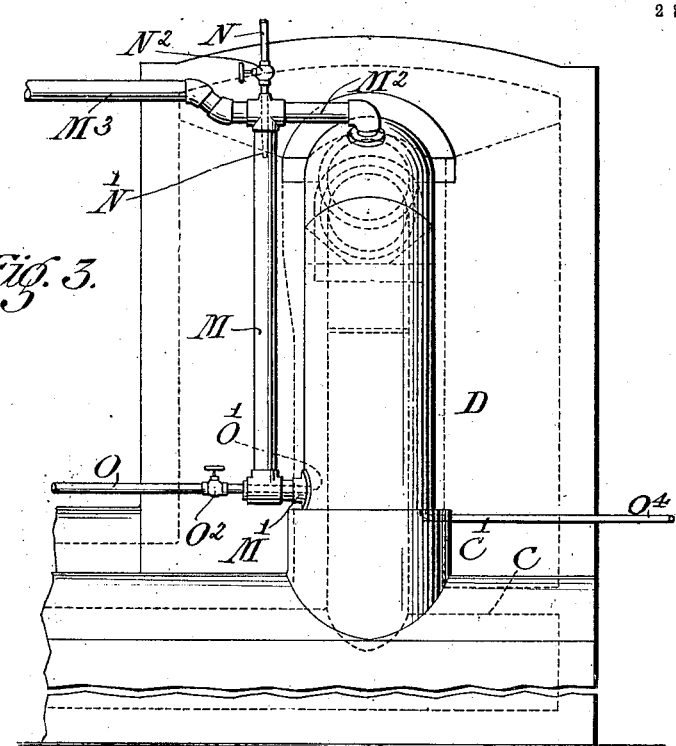
Figure 4:
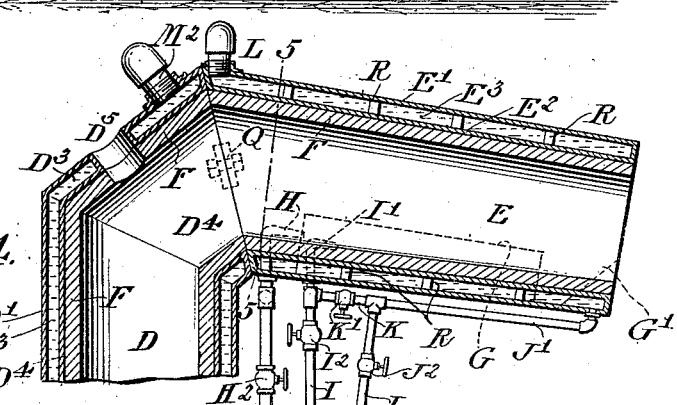
Figure 5:
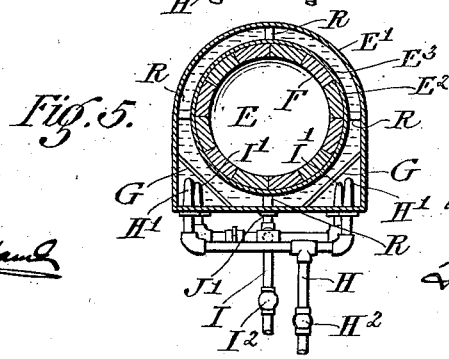

Figure 1 is a sectional elevation taken through the gas and air port of a regenerative open hearth furnace on the line 1—1 of Fig. 2. Fig. 2 is a sectional plan view on the line 2—2 of Fig. 1. Fig. 3 an end elevation of a furnace showing the gas port connections therewith. Fig. 4 is an enlarged sectional view of the gas port and its direct connections taken on the same section as that shown in Fig. 1. Fig. 5 is a cross-section on the line 5—5 of Fig. 4 and Fig. 6 a perspective view of the lower end of the water back constituting the gas port.

A is the body of the regenerative open hearth furnace, A' the port through which the air and gas enter the furnace and through which the products of combustion leave the furnace when the regenerators are reversed.

B, is an air flue leading from a regenerator, not shown, and communicating through the branches B', B', with the air port B² which communicates with the port A'.

C is a flue leading from the gas regenerator, not shown, and communicating through the brick flue C' with the removable vertical gas conduit D formed with an angularly set head D⁴ and made up of a double walled metallic tube lined with refractory material. The walls of the tube are shown at D' and D². The water space between these walls is indicated at D³ and the firebrick lining is indicated at F. A handhole D⁵ is indicated in the angularly set head of the vertical gas conduit and convenient provision should be made for the circulation of water through the space D³. As shown, I provide a pipe M opening into the bottom of the water space D³ through a branch M' and into the top thereof through a branch M² while a branch M³ leads to waste.

N is a water supply pipe having a valve N² and a nozzle N' which projects down into the pipe M as shown.

O is a water supply pipe leading into the bottom of the water space of the vertical gas conduit, as indicated at O', O² being a valve.

O⁴ is an outlet pipe of restricted area.

In normal operation the water is introduced through the nozzle N' entering the water pipe M and passing down through it and its continuation at M' to the bottom of the water back D³, and circulating upward through the water back to and through the pipe M², a portion of the water being carried down through the pipe M and a portion passing off through the waste pipe M³. It is advisable that the pipe O should be opened at frequent intervals so that a jet of water will enter the bottom of the water back to stir up and carry with it the sediment which would tend to accumulate in the bottom of the water back. The sediment passes out through the outlet pipe O⁴ which I find it advisable to keep open at all times so that there is a constant flow of water from the bottom of the water back and thus sediment is always carried away.

The gas port proper, indicated at E, consists of a double walled metallic tube, the walls of which are indicated at E' and E² and the water space of which is indicated at E³, R, R, etc., indicating stays. This tube is lined with firebrick as indicated at F and is preferably formed with its lower end corners truncated, as is best shown at G', G', Fig. 6. As shown, and as I prefer to construct the gas port, the inner wall E² of the tube is of approximately circular section and the lining F fits against it, so that when the lining is expanded by heat it presses against the wall E² insuring a firm contact and that the water back shall properly cool the lining. The interior of the water back is divided into communicating chambers by partitions G G. The upper or outer end of the water back is formed to fit against the oblique head D⁴ of the vertical gas conduit, as shown in Figs. 1 and 4, and is fastened thereto in any convenient way, as by means of lugs and bolts indicated at Q. The front lower portion of the tubular gas conduit is set in the brick work A² of the furnace, as best shown in Fig. 1, the sides being set in the brick work as shown at A³, A³, in Fig. 2. The upper portion of the gas conduit is covered with refractory material, preferably of a sandy character, as indicated at P, Fig. 1. Water circulation through the gas conduit must of course be provided for, and by preference I use the system indicated in the drawings, a water supply pipe H having valve H² connecting through branches with the nozzles H', H', directed into the lateral compartments formed by the oblique partitions G, G, and an escape for water being provided through the outlet pipe indicated at L. The accumulation of sediment in the lower inner end of the gas port water back is provided against, partly by the truncation of the lower corners of the water back, as shown at G', G', and partly by the provision of a pipe J' opening into the lower end of the water back and communicating with an outflow pipe J having a valve J². The pipe J' also communicates through a branch K having a valve K' with an auxiliary water supply pipe I having a valve I² and communication with the interior of the water back through branches having delivery nozzles I', I', which, like the nozzles H', are turned into the lateral compartments formed by the partitions in the water back. The accumulation of sediment in the lower end of the water back is avoided by opening the cock J² of the outflow pipe J permitting a restricted amount of water to pass out through the pipe J'; when to stir up the sediment, or for any other reason, an unusually energetic flow of water is desired, water is introduced through the pipe J', as well as the nozzles I', I', by opening the cock I² and cock K' and closing the cock J².

In another application filed by me January 7, 1910, Serial Number 536,779, I have described a water back for gas ports having, with regard to the circulating mechanism, many features which are common also to the structure above described. So far as the circulating means are in themselves new they are claimed in my said other application and only intended to be claimed in this case as applied to the special structure of the tubular gas conduit.

Having now described my invention what I claim as new and desire to secure by Letters Patent is—

1. In combination with a regenerative open hearth furnace, a gas port consisting of a double walled metallic tube constituting a water back and lined with refractory material, said tube extending into the furnace through the outer wall thereof and having its front bottom portion and its sides set in the brickwork of the furnace and a covering of refractory material over its top, and means for causing water to circulate in said water back.

2. In combination with a regenerative open hearth furnace, a gas port consisting of a double walled metallic tube constituting a water back and lined with refractory material, said tube extending into the furnace through the outer wall thereof and having its front bottom portion and its sides set in the brick work of the furnace and a covering of refractory material over its top, a vertical gas conduit also consisting of a double walled metallic tube lined with refractory material, said conduit connecting with the gas port at its top and with the gas generator at its bottom and means for causing water to circulate in both the gas port and the vertical gas conduit.

3. A tubular water back for a gas port having longitudinal internal partitions forming chambers open at both ends in combination with water inlet nozzles directed into the rear ends of the spaces separated from the body of the water back by said partitions and an outlet for water and steam at the rear top of the water back.

4. A tubular water back for a gas port having longitudinal internal partitions forming chambers open at both ends and having its lower front lateral edges formed obliquely in combination with water inlet nozzles directed into the rear ends of the spaces separated from the body of the water back by said partitions, an outlet for water and steam at the rear top of the water back and a separate outlet of reduced area opening into the lower front portion of the water back.

5. A tubular water back for a gas port having longitudinal internal partitions forming chambers open at both ends in combination with water inlet nozzles directed into the rear ends of the spaces separated from the body of the water back by said partitions, an outlet for water and steam at the rear top of the water back and a separate outlet of reduced area opening into the lower front portion of the water back and means for forcing water directly into the lower front portion of the water back.

6. In combination with a regenerative furnace having a gas port, a gas conduit connecting said port and a regenerator, said conduit consisting of a double walled metallic tube lined with firebrick, a water conduit connecting the top and bottom of the water space in the gas conduit, a water injection nozzle directed downward into the water pipe and means for passing off surplus water from the water space of the gas conduit.

7. In combination with a regenerative furnace having a gas port, a gas conduit connecting said port and a regenerator, said conduit consisting of a double walled metallic tube lined with firebrick, a water conduit connecting the top and bottom of the water space in the gas conduit, a water injection nozzle directed downward into the water pipe, a separate water injection nozzle directed into the bottom of the water space in the gas conduit, and means for passing off surplus water from the water space of the gas conduit.

8. In combination with a regenerative furnace having a gas port, a gas conduit connecting said port and a regenerator, said conduit consisting of a double walled metallic tube lined with firebrick, a water conduit connecting the top and bottom of the water space in the gas conduit, a water injection nozzle directed downward into the water pipe, a separate water injection nozzle directed into the bottom of the water space in the gas conduit, a restricted water outlet from the bottom of the said bottom of the water space and a main water outlet from the top of the water space.

ALAN WOOD, 3RD.

Witnesses:
WM. WRIGHT,
W. F. BARRETT.